(12) United States Patent
Miyajima et al.

(10) Patent No.: US 10,239,695 B2
(45) Date of Patent: Mar. 26, 2019

(54) CONVEYOR BELT

(71) Applicant: The Yokohama Rubber Co., LTD., Minato-ku, Tokyo (JP)

(72) Inventors: Atsushi Miyajima, Hiratsuka (JP); Etsuko Suzuki, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/742,013

(22) PCT Filed: Jun. 16, 2016

(86) PCT No.: PCT/JP2016/067885
§ 371 (c)(1),
(2) Date: Jan. 4, 2018

(87) PCT Pub. No.: WO2017/010221
PCT Pub. Date: Jan. 19, 2017

(65) Prior Publication Data
US 2018/0194560 A1    Jul. 12, 2018

(30) Foreign Application Priority Data

Jul. 13, 2015 (JP) .................................. 2015-139344

(51) Int. Cl.
*B32B 5/04* (2006.01)
*B65G 15/34* (2006.01)

(52) U.S. Cl.
CPC ................ *B65G 15/34* (2013.01); *B32B 5/04* (2013.01); *B32B 2307/51* (2013.01);
(Continued)

(58) Field of Classification Search
CPC ...................................................... B65G 15/34
(Continued)

(56) References Cited

U.S. PATENT DOCUMENTS 2,841,515 A * 7/1958 Runton ................... B32B 27/00
156/179
3,335,843 A * 8/1967 Duvuvier et al. .. B01F 17/0021
156/279

(Continued)

FOREIGN PATENT DOCUMENTS

JP     S63-017711     1/1988
JP     H02-261711    10/1990

(Continued)

OTHER PUBLICATIONS

International Search Report for International Application No. PCT/JP2016/067885 dated Sep. 20, 2016, 4 pages, Japan.

*Primary Examiner* — James R Bidwell
(74) *Attorney, Agent, or Firm* — Thorpe North & Western (57) ABSTRACT

A conveyor belt includes an upper cover rubber and a lower cover rubber disposed above and below a core layer; and a protective fiber layer made from high strength fiber disposed at least in a central portion of the upper cover rubber in a belt width direction and extending continuously in a belt longitudinal direction; an elastic modulus E of the protective fiber layer in the belt longitudinal direction being a low elastic modulus E1 equal to or less than a predetermined value when a tension in the belt longitudinal direction acting on the conveyor belt is equal to or less than a setting tension Ts, and being a high elastic modulus E2 higher than the low elastic modulus E1 when a predetermined high tension higher than the setting tension Ts is acting on the conveyor belt.

14 Claims, 8 Drawing Sheets

(52) U.S. Cl.
CPC ...... *B32B 2433/02* (2013.01); *B65G 2207/48* (2013.01); *B65G 2812/02198* (2013.01); *B65G 2812/02217* (2013.01)

(58) Field of Classification Search
USPC .......................................................... 198/847
See application file for complete search history.

(56) References Cited

U.S. PATENT DOCUMENTS

| | | | | |
|---|---|---|---|---|
| 3,616,164 | A | * | 10/1971 | Tanimoto ............... B29D 29/06 442/358 |
| 4,674,622 | A | * | 6/1987 | Utsunomiya ........... B32B 25/10 198/500 |
| 6,092,645 | A | * | 7/2000 | Wahren ..................... B32B 7/02 198/847 |
| 2013/0081929 | A1 | * | 4/2013 | Nordell .................. B65G 15/36 198/847 |
| 2015/0232276 | A1 | * | 8/2015 | Miyajima .............. B65G 15/36 198/847 |

FOREIGN PATENT DOCUMENTS

| | | | | |
|---|---|---|---|---|
| JP | H05-064112 | | 8/1993 | |
| JP | 2-16-94299 | * | 5/2016 | ............. B65G 15/40 |

\* cited by examiner

CONVEYOR BELT

TECHNICAL FIELD

The present technology relates to a conveyor belt and particularly relates to a conveyor belt that can provide a longer service life by suppressing the damage caused to an upper cover rubber by objects to be conveyed fed onto the upper cover rubber without increasing the energy required for operating the conveyor belt.

BACKGROUND ART

Conveyor belts include a core layer disposed between an upper cover rubber and a lower cover rubber that bears the tension when the conveyor belt is mounted in a tensioned state. Damage to the core layer makes it difficult for the conveyor belt to be mounted normally. Thus, to keep the conveyor belt operational, it is important to prevent damage to the core layer.

Object to be conveyed are fed onto the upper cover rubber, impacting upon the upper cover rubber with a force that is greater the higher the height from which they were feed or the greater the weight of the objects to be conveyed. Damage is accelerated by greater impacts, causing greater deformation in the upper cover rubber. Excessive damage to the upper cover rubber makes the core layer susceptible to damage. This in turn shortens the service life of the conveyor belt.

A structure is known in which a reinforcing layer is provided in an upper cover rubber to improve the heat resistance and the shock resistance of a conveyor belt (see Japanese Unexamined Patent Application Publication No. H2-261711). In this structure, the warp thread that composes the reinforcing layer has a lower elastic modulus in the length direction than the tension layer (core layer), and the weft thread has heat resistance and shock resistance. In other words, this disclosed technology is based on the reinforcing layer being composed of warp thread and weft thread, and other configurations are not considered. Additionally, by the warp thread having an elastic modulus in the length direction lower than that of the tension layer (core layer), excess bending rigidity is avoided when the conveyor belt bends.

However, by the warp thread having a reduced elastic modulus in the length direction, when the impact on the upper cover rubber is great, this force is dissipated less effectively. Accordingly, this structure has difficulty protecting the core layer from the impact of fed objects to be conveyed over an extended period of time, and thus is unsuited to lengthening the service life of the core layer.

SUMMARY

The present technology provides a conveyor belt that can provide a longer service life by suppressing the damage caused to an upper cover rubber by objects to be conveyed fed onto the upper cover rubber without increasing the energy required for operating the conveyor belt.

A conveyor belt according to an embodiment of the present technology comprises:

a core layer;

an upper cover rubber and a lower cover rubber disposed above and below the core layer; and a protective fiber layer made from high strength fiber disposed at least in a central portion of the upper cover rubber in a belt width direction and extending continuously in a belt longitudinal direction;

an elastic modulus of the protective fiber layer in the belt longitudinal direction being a low elastic modulus equal to or less than a predetermined value when a tension in the belt longitudinal direction acting on the conveyor belt is equal to or less than a setting tension acting when the conveyor belt is mounted in a tensioned state between pulleys; and the elastic modulus of the protective fiber layer in the belt longitudinal direction being a high elastic modulus higher than the low elastic modulus when a predetermined high tension higher than the setting tension is acting on the conveyor belt.

According to an embodiment of the present technology, the protective fiber layer is disposed in the central portion of the upper cover rubber in the belt width direction where the objects to be conveyed are mainly fed. By the elastic modulus of the protective fiber layer in the belt longitudinal direction being the low elastic modulus equal to or less than a predetermined value when the tension acting on the conveyor belt is equal to or less than the setting tension of the conveyor belt in the longitudinal direction, essentially no effect is acted on the bending rigidity when the conveyor belt bends. This prevents an increase in the energy required for operating the conveyor belt. When the high elastic modulus higher than the setting tension of the conveyor belt in the longitudinal direction acts on the conveyor belt, the elastic modulus of the protective fiber layer in the belt longitudinal direction is the high elastic modulus higher than the low elastic modulus. This allows the impact from the fed objects to be conveyed to be sufficiently dissipated by the protective fiber layer. Effectively preventing damage to the core layer in this manner is greatly beneficial in lengthening the service life of the conveyor belt.

In another embodiment for example, the low elastic modulus and the high elastic modulus of the protective fiber layer are attributable to a woven structure of the protective fiber layer. Specifically, the protective fiber layer is a knit fabric or jersey fabric of the high strength fiber.

In another embodiment, the low elastic modulus and the high elastic modulus of the protective fiber layer are attributable to an arrangement structure of the protective fiber layer. Specifically, the protective fiber layer itself is disposed rendered with a wave-like shape in the thickness direction of the conveyor belt.

In another embodiment, the protective fiber layer is disposed at a position less than half a layer thickness from a top of the upper cover rubber. This configuration allows the impact from the fed objects to be conveyed to be dissipated by the protective fiber layer at and around the surface of the upper cover rubber. Thus, the area in the depth direction of the upper cover rubber that is damaged is reduced. This is beneficial in lengthening the service life of the conveyor belt.

In another embodiment, the protective fiber layer is a plurality of layers vertically layered on top of one another. This configuration allows the impact from the fed objects to be conveyed to be dissipated by the plurality of protective fiber layers. This is beneficial in reducing damage to the upper cover rubber and in lengthening the service life of the conveyor belt.

In another embodiment, the protective fiber layer is a plurality of sections divisible in the belt longitudinal direction. This configuration allows, if the protective fiber layer suffers from peeling damage, the area of the protective fiber layer peeled off to be suppressed to a small area. The plurality of divisible sections can be formed by dividing the protective fiber layer at predetermined lengths in the belt longitudinal direction in advance. Alternatively, a configuration can be employed in which slits (perforations) are provided in advance at predetermined intervals in the belt longitudinal direction of the protective fiber layer that divide into sections with a predetermined length when an outside peel force acts on the protective fiber layer.

In this embodiment, the protective fiber layer when divided in the longitudinal direction preferably has a length in the belt longitudinal direction of 1 m or less. When the length in the belt longitudinal direction is excessively large, a large area of the protective fiber layer is peeled off. When the length in the belt longitudinal direction is excessively small, the manufacturing process of the belt becomes complex.

In another embodiment, the high strength fiber is an aramid fiber, a phenylene benzobisoxazole fiber, a high strength polyethylene fiber, a polyarylate fiber, or an ultra high strength polyvinyl alcohol fiber.

DETAILED DESCRIPTION

A conveyor belt according to embodiments of the present technology will be described below with reference to the drawings. Note that the dot-dash line CL in the drawings represents the center in the belt width direction.

Figure 1:
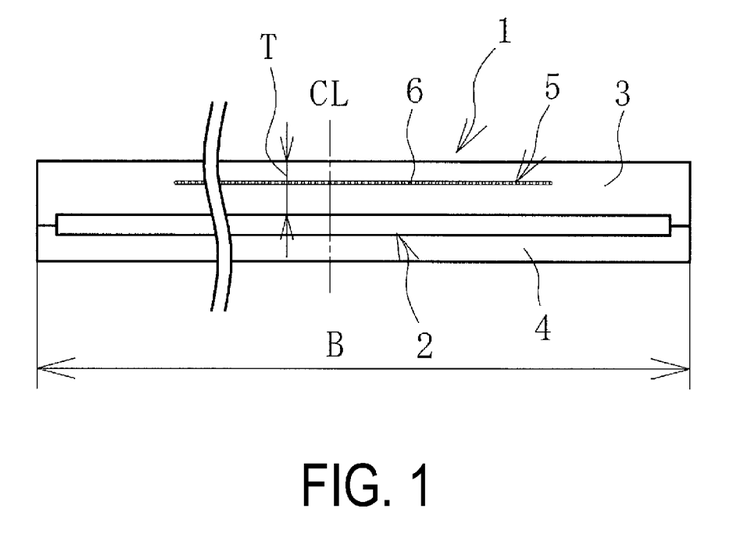
FIG. 1 is a cross-sectional view illustrating a conveyor belt according to an embodiment of the present technology.
Figure 2:
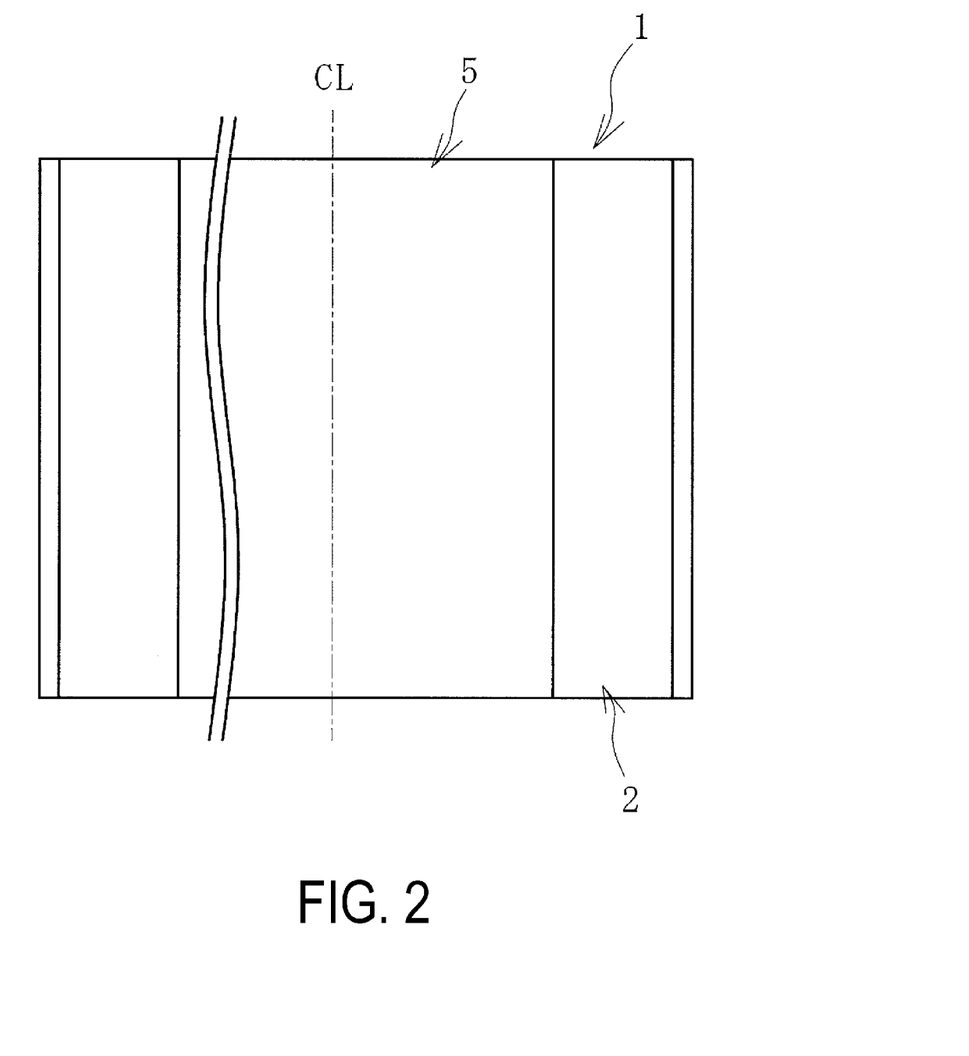
FIG. 2 is an explanatory drawing illustrating the internal structure of the conveyor belt of FIG. 1 in a plan view.
Figure 3:
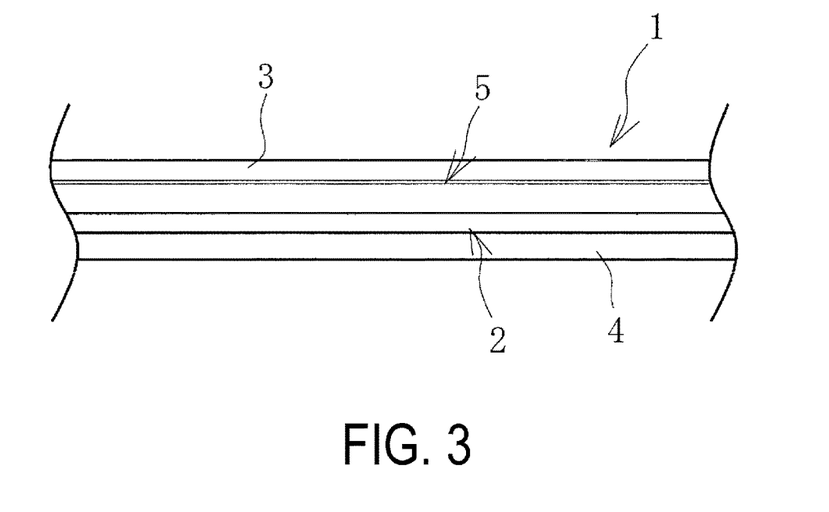
FIG. 3 is an explanatory drawing illustrating the internal structure of the conveyor belt of FIG. 1 as viewed from the side.

A conveyor belt 1 of an embodiment of the present technology is illustrated in FIGS. 1 to 3. The conveyor belt 1 is provided with a core layer 2, and an upper cover rubber 3 and a lower cover rubber 4 disposed above and below the core layer 2. These components are integrally formed with one another via vulcanization. The core layer 2 may be a canvas layer made from fibers, or a steel cord layer made from a plurality of steel cords disposed side-by-side in the belt width direction. Specifically, the core layer 2 is covered with a cushion rubber, and the cushion rubber is bonded to the upper cover rubber 3 and the lower cover rubber 4 via vulcanization bonding.

For the upper cover rubber 3 and the lower cover rubber 4, a rubber composition may be used that contains at least a diene rubber including natural rubber, and carbon black to achieve good wear resistance. The layer thickness of the upper cover rubber 3 and the lower cover rubber 4 is determined as appropriate depending on the desired performance of the conveyor belt 1. The cushion rubber is a rubber with excellent adhesiveness.

The present embodiment of the present technology further includes a protective fiber layer 5 made from high strength fiber 6. In the present embodiment, the protective fiber layer 5 is a single layer, but a multi-layer configuration can also be employed. "High strength fiber 6" refers to fiber with a tensile strength of 2 GPa or greater, for example. Examples of the high strength fiber 6 include aramid fiber, phenylene benzobisoxazole (PBO) fiber, high strength polyethylene fiber, polyarylate fiber, and ultra high strength polyvinyl alcohol (PVA) fiber. The high strength fiber 6 may be monofilament or spun yarn and have an outer diameter ranging from 0.1 mm to 1.5 mm, for example. The layer thickness of the protective fiber layer 5 ranges from 0.15 mm to 2.0 mm, for example.

The protective fiber layer 5 is disposed at least in the central portion of the upper cover rubber 3 in the belt width direction. "Central portion in the belt width direction" refers to an area in the central portion in the belt width direction having from approximately 50% to 70% of the belt width B. The protective fiber layer 5 can be disposed across the entire width of the belt.

The protective fiber layer 5 is disposed at a position less than half the layer thickness T from the top of the upper cover rubber 3, and is bonded to the upper cover rubber 3 extending continuously in the belt longitudinal direction. In other words, the protective fiber layer 5 is disposed in an annular manner around the entire belt longitudinal direction. The protective fiber layer 5 may also be disposed exposed at the surface of the upper cover rubber 3 or embedded in the upper cover rubber 3 without being exposed. The conveyor belt 1 may also include edge rubber disposed on each end portion in the belt width direction or other constituents as appropriate.

Figure 4:
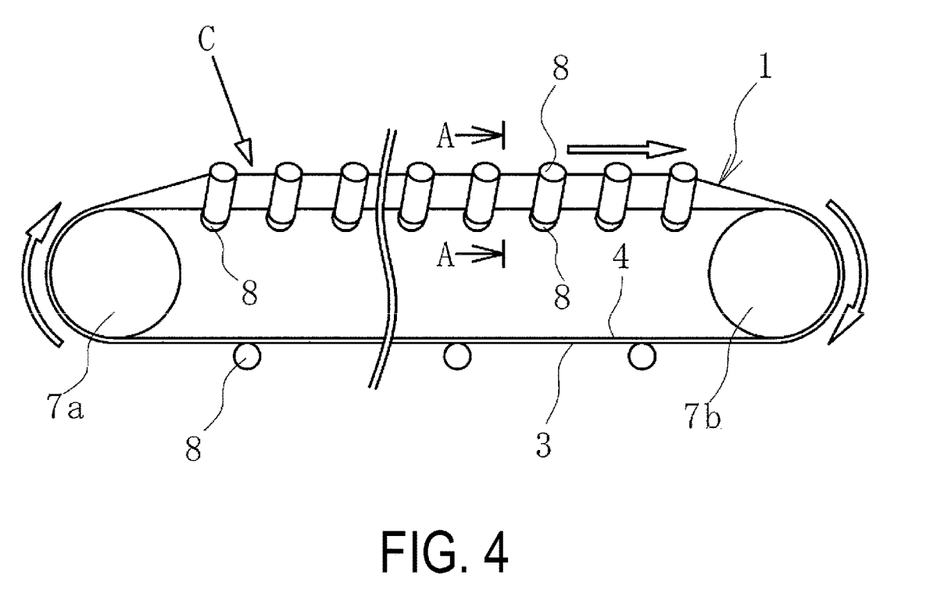
FIG. 4 is an explanatory drawing illustrating a conveyor belt according to an embodiment of the present technology mounted in a tensioned state between pulleys as viewed from the side.
Figure 5:
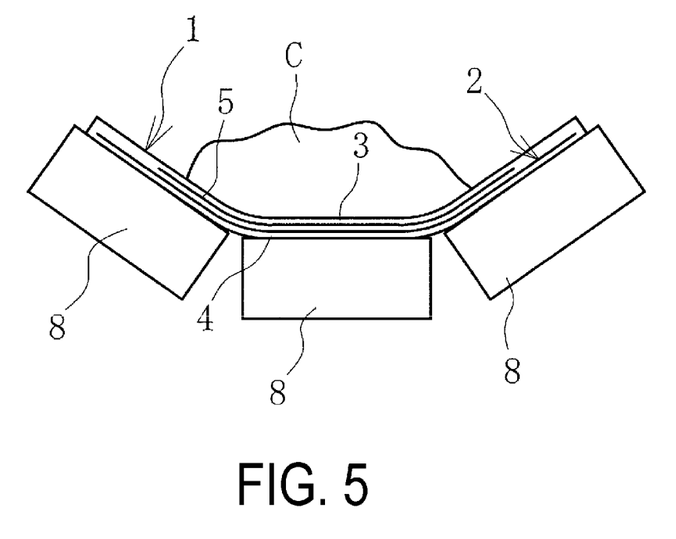
FIG. 5 is a cross-sectional view taken along A-A of FIG. 4.

As illustrated in FIGS. 4 and 5, the conveyor belt 1 is mounted in a tensioned state between pulleys 7a, 7b. The conveyor belt 1 on the carrying side is supported in a trough shape projecting downward by support rollers 8. The fed objects to be conveyed C are mainly placed in the central portion in the belt width direction.

A predetermined setting tension Ts in the belt longitudinal direction acts on the conveyor belt 1 mounted on the pulleys 7a, 7b. The tension that acts on the conveyor belt 1 is essentially borne by the core layer 2, thus the predetermined setting tension Ts in the belt longitudinal direction acts on the core layer 2. Accordingly, the protective fiber layer 5 essentially bears none of the tension acting on the conveyor belt 1.

In an embodiment of the present technology, the protective fiber layer 5 has special specifications. In conditions when the tension in the belt longitudinal direction that acts on the conveyor belt 1 (core layer 2) is the setting tension Ts or less, the elastic modulus E of the protective fiber layer 5 in the belt longitudinal direction has a low elastic modulus E1 equal to or less than the predetermined value. When the tension in the belt longitudinal direction that acts on the conveyor belt 1 (core layer 2) is a predetermined high tension Th higher than the setting tension Ts, the elastic modulus E of the protective fiber layer 5 in the belt longitudinal direction has a high elastic modulus E2 higher than the low elastic modulus E1.

The magnitude of the setting tension Ts depends on the specifications of the conveyor belt 1. The value is set to a value appropriate to enable normal operation of the conveyor belt 1, typically a value approximately 1/10 of the nominal strength of the conveyor belt 1 (nominal value for strength of the belt (minimum value for tensile strength (N/mm) per 1 mm width of the belt)). The conveyor belt 1 (core layer 2) under such conditions has an elongation ranging from 0.3 to 3%, though this depends on the material. The elastic modulus of the core layer 2 ranges approximately from 1000 N/mm to 10000 N/mm, though this also depends on the nominal strength of the belt. The low elastic modulus E1 ranges from 10 N/mm·ply to 100 N/mm·ply, for example. "N/mm" means the tensile strength or elastic modulus that acts on 1 mm width of the belt core layer. "N/mm·ply" means the tensile strength or elastic modulus that acts on 1 mm width of a single ply layer.

"High tension Th" refers to the localized excessive tension in the conveyor belt 1 caused by the fed object to be conveyed C and the like. The value for the high tension Th per unit width W of the core layer 2 (Th/W) ranges from 400 N/mm to 2500 N/mm, for example. The high elastic modulus E2 ranges from 200 N/mm·ply to 1000 N/mm·ply, for example. Alternatively, the high elastic modulus E2 may range from 200% to 10000% of the low elastic modulus E1.

In other words, the protective fiber layer 5 in a region of low rigidity in the belt longitudinal direction has an elongation ranging from 5% to 20%, for example, having a relatively high elongation. The rigidity in the belt longitudinal direction in the regions of middle to high rigidity in the belt longitudinal direction has a relatively low elongation.

In the conveyor belt 1, the protective fiber layer 5 is disposed in the upper cover rubber 3. However, the elastic modulus E of the protective fiber layer 5 in the belt longitudinal direction is equal to or less than the low elastic modulus E1 under conditions in which the acting tension is equal to or less than the setting tension Ts of the conveyor belt 1 in the longitudinal direction. Thus, the bending rigidity of the conveyor belt 1 when the conveyor belt 1 is run around the pulleys 7a, 7b and bends does not significantly increase, and there is no significant effect on the flexibility of the conveyor belt 1. In other words, under normal operation conditions of the conveyor belt 1, there is no significant change in the bending rigidity of the conveyor belt 1 in the belt longitudinal direction even if a protective fiber layer 5 is present. Thus, there is no increase in the energy required for operating the conveyor belt 1.

The elastic modulus E of the protective fiber layer 5 in the belt longitudinal direction, under conditions in which the predetermined high tension Th in the longitudinal direction is acting on the conveyor belt 1, becomes the high elastic modulus E2. Thus, when a tension significantly greater than the setting tension Ts acts on the conveyor belt 1 during normal operation, the protective fiber layer 5 is pulled and a corresponding tension is produced in the belt longitudinal direction in the protective fiber layer 5.

Accordingly, the impact on the conveyor belt 1 from the fed objects to be conveyed can be sufficiently dispersed throughout the entire protective fiber layer 5 and dissipated by the corresponding tension produced in the protective fiber layer 5. In other words, the impact is dissipated and absorbed by the protective fiber layer 5, and deformation in the upper cover rubber 3 is reduced. As a result, damage to the upper cover rubber 3 can be suppressed, and thus damage to the core layer 2 can be effectively prevented. This is greatly beneficial in lengthening the service life of the conveyor belt 1.

In the present embodiment, the protective fiber layer 5 is only disposed in the belt central portion of the upper cover rubber 3 which is the main region where the objects to be conveyed C are fed and placed. This allows damage to the upper cover rubber 3 to be effectively suppressed while keeping the area of the protective fiber layer 5 to a minimum. This contributes to reducing the weight of the conveyor belt 1.

The protective fiber layer 5 can be disposed in the upper cover rubber 3 at a discretionary position in the depth direction. However, by disposing the protective fiber layer 5 at a position less than half the layer thickness T from the top of the upper cover rubber 3, the impact received from the fed objects to be conveyed C can be dissipated throughout the area around the surface of the upper cover rubber 3. Thus, the area of the upper cover rubber 3 in the depth direction that is damaged by the impact is reduced. This is beneficial in lengthening the service life of the conveyor belt 1.

Setting the elastic modulus E of the protective fiber layer 5 as described above to the low elastic modulus E1 and the high elastic modulus E2 can be achieved via a specific woven structure of the protective fiber layer 5. Specifically, the woven structure is a knit fabric, jersey fabric of the high strength fiber 6 with high elasticity.

Figure 6:
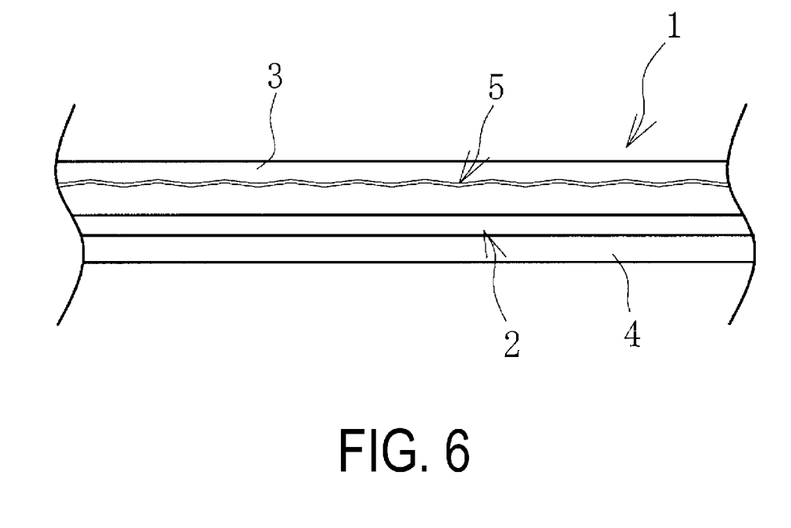
FIG. 6 is an explanatory drawing illustrating the internal structure of a conveyor belt according to another embodiment of the present technology as viewed from the side.

Setting the elastic modulus E of the protective fiber layer 5 as described above to the low elastic modulus E1 and the high elastic modulus E2 can also be achieved via a specific arrangement structure of the protective fiber layer 5. Specifically, instead of only the warp thread of the protective fiber layer 5 undulates up and down, and as illustrated in FIG. 6, the protective fiber layer 5 itself is disposed rendered with a wave-like shape up and down in the thickness direction of the conveyor belt 1. With only the warp thread undulating up and down, under conditions in which the tension is equal to or less than the setting tension Ts, the elastic modulus E of the protective fiber layer 5 cannot be sufficiently reduced. However, with the protective fiber layer 5 itself undulating up and down, a satisfactory low elastic modulus E1 can be ensured. Of course, the specific woven structure of the protective fiber layer 5 may be employed as well as the specific arrangement structure described above to set the elastic modulus E of the protective fiber layer 5 as described above to the low elastic modulus E1 and the high elastic modulus E2.

Figure 7:
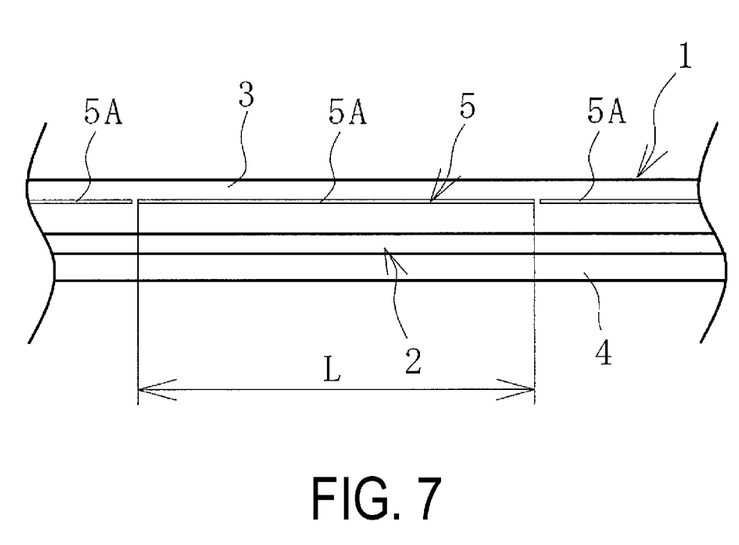
FIG. 7 is an explanatory drawing illustrating the internal structure of a conveyor belt according to yet another embodiment of the present technology as viewed from the side.
Figure 8:
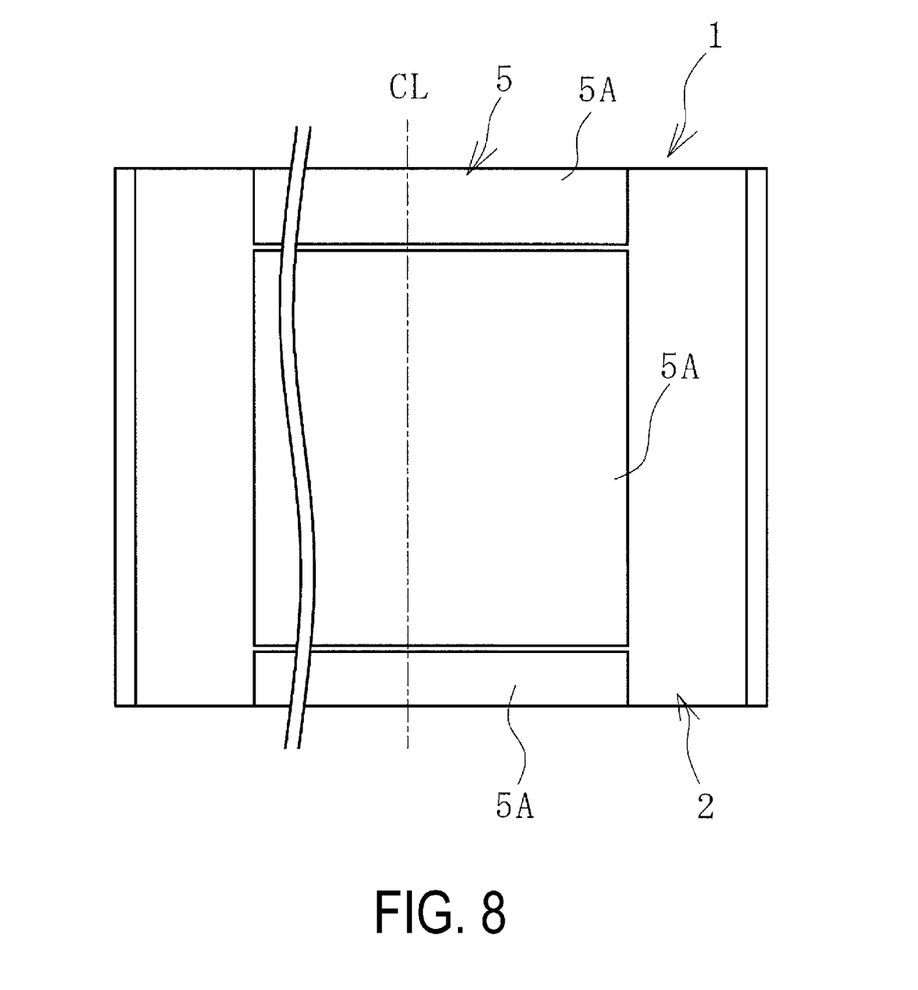
FIG. 8 is an explanatory drawing illustrating the protective fiber layer of FIG. 7 in a plan view.
Figure 9:
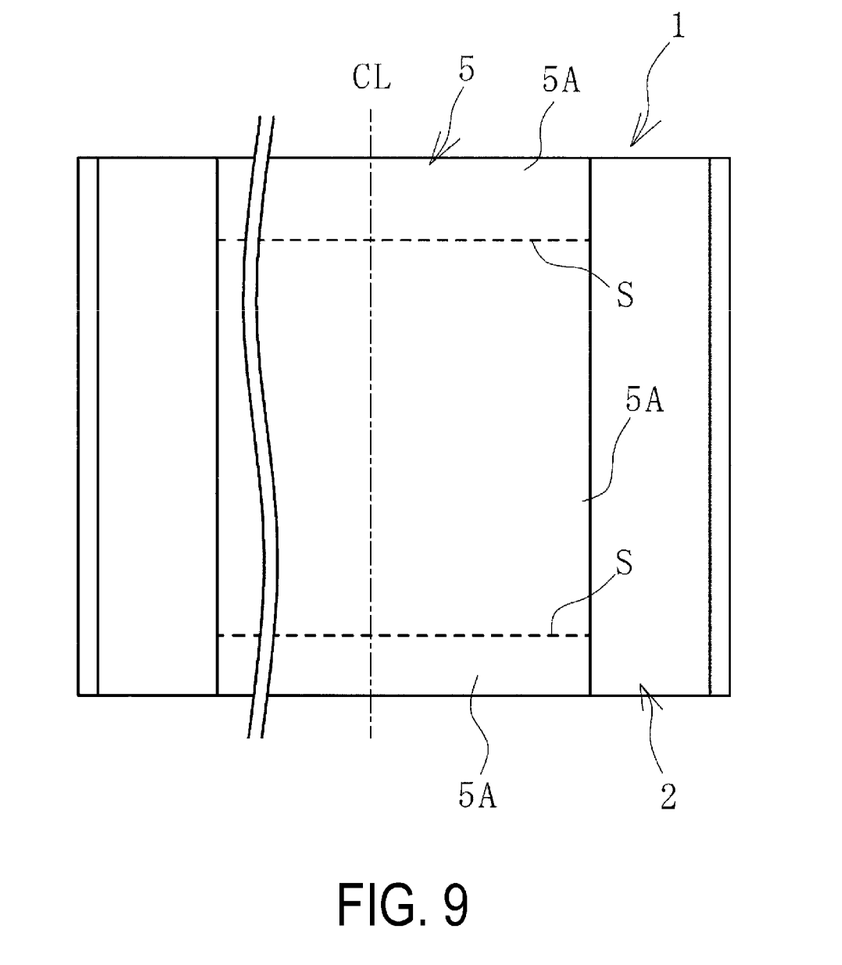
FIG. 9 is an explanatory drawing illustrating a modified example of the protective fiber layer of FIG. 7 in a plan view.

The protective fiber layer 5 can have a continuously joined configuration in the belt longitudinal direction or a configuration divisible in separate sections. For example, as illustrated in FIGS. 7 and 8, the protective fiber layer 5 can have a configuration in which a plurality of sections 5A which have a predetermined length L in the belt longitudinal direction are disposed adjacent to one another. Specifically, the sections 5A are completely divided in the belt longitudinal direction and disposed adjacent to one another in the belt longitudinal direction. Alternatively, as illustrated in FIG. 9, a configuration can be employed in which slits S (perforations) are provided in advance at predetermined intervals of length L in the belt longitudinal direction of the protective fiber layer 5 that divide into sections with a predetermined length L when an outside peel force acts on the protective fiber layer 5.

The advantages of providing such a protective fiber layer 5 are that described above. However, a scraper disposed to slide across the upper cover rubber 3 somehow coming into contact with the protective fiber layer 5 should also be considered. In such a case, by having a configuration in which the protective fiber layer 5 is divisible into separate sections, if the protective fiber layer 5 is damaged by a scraper coming into contact with and peeling off the protective fiber layer 5, the area of the protective fiber layer 5 peeled off can be contained to only the portion with the predetermined length L. As a result, the area of the protective fiber layer 5 peeled off can be kept small, thus keeping the damage to the conveyor belt 1 to a minimum.

The predetermined length L of the protective fiber layer 5 is 1 m or less, for example. When the predetermined length L is excessively large, a large area of the protective fiber layer 5 is peeled off. When the predetermined length L is excessively small, management of the protective fiber layer 5 (sections 5A) becomes complex, as does the manufacturing process of the belt. Thus, the predetermined length L of the protective fiber layer 5 preferably ranges from 0.5 m to 1 m, for example.

Figure 10:
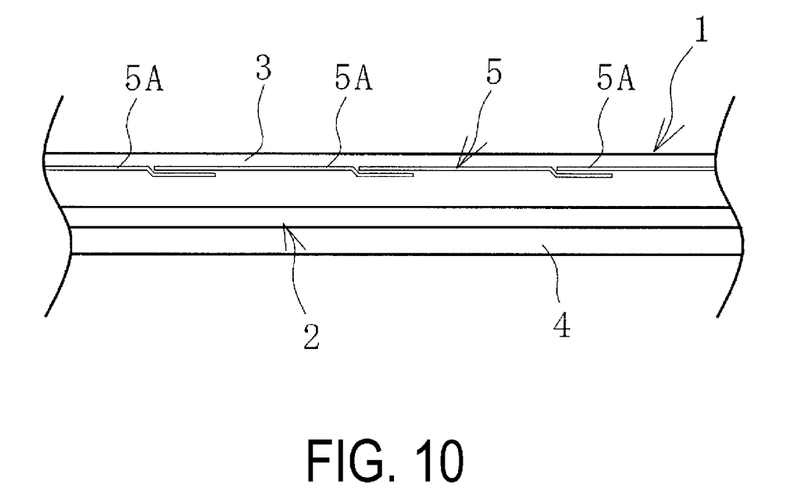
FIG. 10 is an explanatory drawing illustrating the internal structure of a conveyor belt according to yet another embodiment of the present technology as viewed from the side.

As illustrated in FIG. 10, a configuration in which the sections 5A are disposed adjacent to one another in the belt longitudinal direction can have end portions vertically overlapping, with first ends of the sections 5A in the belt longitudinal direction disposed under second ends of the adjacent sections 5A in the belt longitudinal direction. This allows only the end portions of the sections 5A in the belt longitudinal direction to vertically overlap. By covering the end portions with a cushion rubber with excellent adhesive strength, the end portions of the sections 5A in the belt longitudinal direction are made resistant to protruding out.

Figure 11:
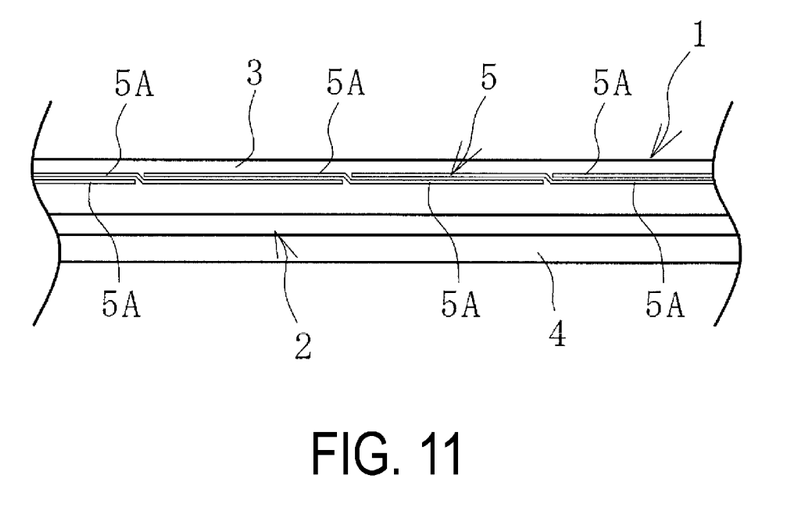
FIG. 11 is an explanatory drawing illustrating the internal structure of a conveyor belt according to yet another embodiment of the present technology as viewed from the side.

In a configuration including vertically arranged multiple layers of the protective fiber layer 5, the protective fiber layers 5 are disposed parallel with one another. Alternatively, as illustrated in FIG. 11, a configuration can be employed in which half of the sections 5A in the belt longitudinal direction vertically overlap with the sections 5A adjacent in the belt longitudinal direction.

The protective fiber layers 5 are disposed in at equal intervals in the thickness direction of the upper cover rubber 3 with an adhesive rubber disposed between each layer. A configuration including a plurality of the protective fiber layers 5 dissipates the shock received from the fed objects to be conveyed C throughout the protective fiber layers 5. This is also beneficial in reducing the biaxial tensile strain as well as uniaxial tensile strain of the upper cover rubber 3 caused by the shock. This is beneficial in reducing damage to the upper cover rubber 3 and in lengthening the service life of the conveyor belt 1.

The invention claimed is:

1. A conveyor belt, comprising:
a core layer;
an upper cover rubber and a lower cover rubber disposed above and below the core layer; and
a protective fiber layer made from high strength fiber disposed at least in a central portion of the upper cover rubber in a belt width direction and extending continuously in a belt longitudinal direction;
an elastic modulus of the protective fiber layer in the belt longitudinal direction being a low elastic modulus equal to or less than a predetermined value when a tension in the belt longitudinal direction acting on the conveyor belt is equal to or less than a setting tension acting when the conveyor belt is mounted in a tensioned state between pulleys;
the elastic modulus of the protective fiber layer in the belt longitudinal direction being a high elastic modulus higher than the low elastic modulus when a predetermined high tension higher than the setting tension is acting on the conveyor belt; and
the low elastic modulus ranges from 10 N/mm·ply to 100 N/mm·ply and the high elastic modulus ranges from 200% to 10000% of the low elastic modulus.

2. The conveyor belt according to claim 1, wherein the low elastic modulus and the high elastic modulus of the protective fiber layer are attributable to a woven structure of the protective fiber layer, the protective fiber layer being a knit fabric or a jersey fabric.

3. The conveyor belt according to claim 1, wherein the low elastic modulus and the high elastic modulus of the protective fiber layer are attributable to an arrangement structure of the protective fiber layer, the protective fiber layer being disposed rendered with a wave-like shape in a thickness direction of the conveyor belt.

4. The conveyor belt according to claim 1, wherein the protective fiber layer is disposed at a position less than half a layer thickness from a top of the upper cover rubber.

5. The conveyor belt according to claim 1, wherein the protective fiber layer is a plurality of woven layers vertically layered on top of one another.

6. The conveyor belt according to claim 1, wherein the protective fiber layer is a plurality of sections divided in the belt longitudinal direction.

7. The conveyor belt according to claim 6, wherein the protective fiber layer is divided in the longitudinal direction and has a length in the belt longitudinal direction of 1 m or less.

8. The conveyor belt according to claim 1, wherein the high strength fiber is an aramid fiber, a phenylene benzobisoxazole fiber, a high strength polyethylene fiber, a polyarylate fiber, or an ultra high strength polyvinyl alcohol fiber.

9. The conveyor belt according to claim 2, wherein the low elastic modulus and the high elastic modulus of the protective fiber layer are attributable to an arrangement structure of the protective fiber layer, the protective fiber layer being disposed rendered with a wave-like shape in a thickness direction of the conveyor belt.

10. The conveyor belt according to claim 9, wherein the protective fiber layer is disposed at a position less than half a layer thickness from a top of the upper cover rubber.

11. The conveyor belt according to claim 10, wherein the protective fiber layer is a plurality of woven layers vertically layered on top of one another.

12. The conveyor belt according to claim 11, wherein the protective fiber layer is a plurality of sections divided in the belt longitudinal direction.

13. The conveyor belt according to claim 12, wherein the protective fiber layer is divided in the longitudinal direction and has a length in the belt longitudinal direction of 1 m or less.

14. The conveyor belt according to claim 13, wherein the high strength fiber is an aramid fiber, a phenylene benzobisoxazole fiber, a high strength polyethylene fiber, a polyarylate fiber, or an ultra high strength polyvinyl alcohol fiber.

* * * * *